United States Patent [19]
Garth et al.

[11] Patent Number: 5,873,091
[45] Date of Patent: Feb. 16, 1999

[54] SYSTEM FOR DATA STRUCTURE LOADING WITH CONCURRENT STATISTICAL ANALYSIS

[75] Inventors: John Marland Garth, Gilroy; Koshy John, Fremont; James Alan Ruddy, Gilroy; David Ray Schwartz; Bryan Frederick Smith, both of Morgan Hill, all of Calif.

[73] Assignee: International Business Machines Corporation, Armonk, N.Y.

[21] Appl. No.: 848,006

[22] Filed: Apr. 28, 1997

[51] Int. Cl.⁶ .................................................. G06P 15/163
[52] U.S. Cl. .................................. 707/102; 707/7; 707/8; 707/100; 707/101; 707/707; 707/202; 707/203; 707/204
[58] Field of Search .................................. 707/7, 8, 100, 707/101, 102, 202, 203, 204

[56] References Cited

U.S. PATENT DOCUMENTS

| | | | |
|---|---|---|---|
| 5,222,235 | 6/1993 | Hintz et al. | 707/101 |
| 5,265,244 | 11/1993 | Ghosh et al. | 707/1 |
| 5,446,575 | 8/1995 | Lysakowski, Jr. | 707/104 |
| 5,530,964 | 6/1996 | Alpert et al. | 395/709 |
| 5,692,171 | 11/1997 | Andres | 707/1 |
| 5,758,357 | 5/1998 | Barry et al. | 707/202 |

OTHER PUBLICATIONS

C.J. Date, *An Introduction to Database systems*, 6th Ed., 1995 p. 769.770.

*Primary Examiner*—Paul V. Kulik
*Assistant Examiner*—Jean R. Homere
*Attorney, Agent, or Firm*—Gray Cary Ware Freidenrich

[57] ABSTRACT

A multiprocessing system forms a data structure, such as by loading reorganizing, or recovering, while concurrently collecting various statistics about the data structure. The data structure may comprise tables and/or indices, for example. A first processing unit forms the data structure by assimilating data from one or more data sources into data rows, storing the rows in a buffer, and copying the rows from the buffer to the data structure. Concurrently with the forming step, the same or a second processing unit retrieves the rows from the buffer and applies a predetermined analysis to the rows to formulate statistics regarding the data structure.

32 Claims, 3 Drawing Sheets

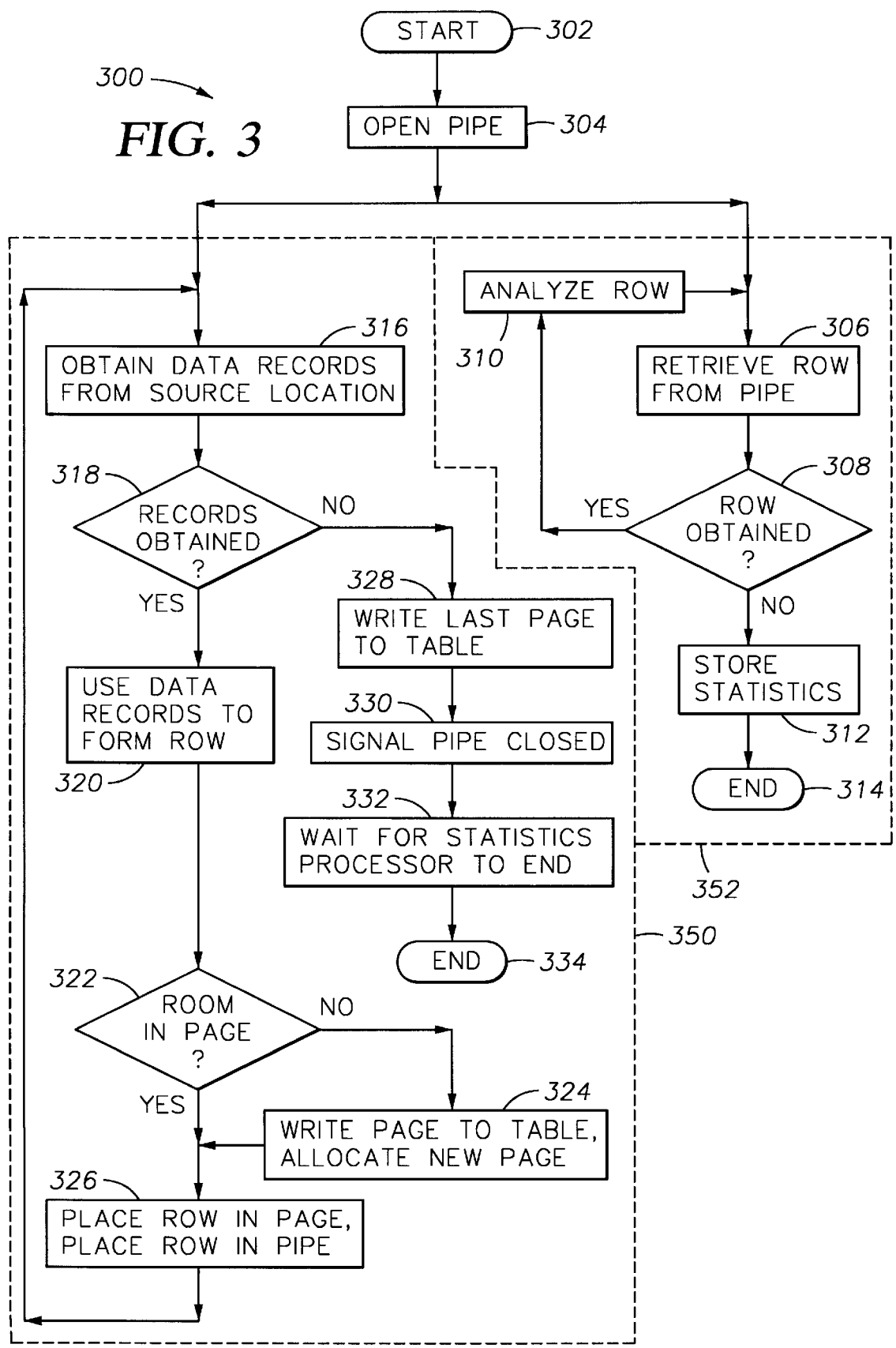

SYSTEM FOR DATA STRUCTURE LOADING WITH CONCURRENT STATISTICAL ANALYSIS

BACKGROUND OF THE INVENTION

1. Field of the Invention

The present invention relates to the use of database tables in computers. More particularly, the invention concerns an apparatus, article of manufacture, and process for loading, reorganizing, or recovering a data structure and simultaneously collecting various statistics concerning the data structure. Such data structures may comprise, for example, tables and/or indices.

2. Description of the Related Art

Database applications constitute one of the most popular applications of computers today. Engineers have designed many different systems and programs to store, query, and modify information stored in database tables. Intricate manipulation of table data is performed using a database language such as "SQL". Higher level operations are typically achieved by executing various high level database commands, in a database system language such as the "DB2" product of International Business Machines Corp. Some of these high level operations include "Load", "Image Copy", "Reorg", and "Recover" operations, for example.

Typically, a database management system performs a "Load" operation to compile data from various sources, and ultimately assemble the data into a new or existing table. A "Reorg" operation copies all rows from of an existing table, stores the rows separately, empties the table's contents, and then re-loads the copied rows back into the table in a desired manner. For example, Reorg procedures are useful to eliminate unwanted space in a table, and to change the order of rows in a table to optimize the table. A "Recover" operation serves to restore a table using a backup copy. Used when a table fails for some reason, a Recovery operation reads table pages from a backup copy, and writes the pages to the failed table. A "Recover Index" operation restores an index using data from an indexed table. More particularly, the Recover Index operation replaces a failed index by scanning the indexed table, and extracting all entries from columns designated as "key" columns. The Recover Index stores these entries in the recovered index, along with the location of each entry in the underlying table.

Another useful DB2 function is the "Runstats" function, which reads a stored data structure and collects various statistics concerning the data structure. It reads each row of a data structure, such as a table or index, from a storage location such as a magnetic data storage drive, analyzes the data, and then provides an operator with various facts about the data itself as well as the way the data is stored within the computer system. As an example, these facts may include the number of rows in the data structure ("cardinality"), the estimated number of distinct values possible for each column of the data structure ("column cardinality"), the percentage of rows that are in clustering order ("cluster ratio"), and the percentage of space in the data structure occupied by data ("percent active"). Statistics such as these are stored in a "data dictionary" or other suitable data store.

The statistics from Runstats are useful for a number of different purposes. First, these statistics enable the database system to optimize access to the data to satisfy a query expressed in a database query language such as "SQL". For example, if the results to a query can be obtained either by scanning an entire table or by reading the table through an index, the database management system ("DBMS") might decide how to process the query based on the statistics relating to the size of the table. If the table is small, for example, it may be more efficient to scan the table rather than to traverse the index.

The Runstats operation is also useful to allow database administrators ("DBAs") to access the status of the database. For example, observing a low value for a table's clustering ratio, a DBA may conclude that the table should be reorganized. Reorganization will resequence the rows in the table to restore their optimal order.

Another use of the Runstats function is to take account of the new characteristics of a data structure after a Load, Reorg, Recover Index, or similar operation. These operations substantially change the characteristics of the data itself, or the manner in which the data is stored. Therefore, a DBA will often perform a Runstats operation immediately after a Load, Reorg, or Recover Index operation.

In addition to DB2, a variety of different programming languages and hardware environments employ statistics-gathering functions similar to Runstats. For example, Oracle-based systems use a similar function to gather statistical information about their data structures.

Despite these benefits, statistics-gathering operations (such as Runstats) may be too slow for certain applications or users. The performance time of these operations can be substantial because of the time required to read the entire contents of an existing data structure. The contents of a data structure may be sizable. Furthermore, reading of the data structure may be slow if the data structure is stored on a hardware device with a relatively slow input/output rate. Thus, when an operation such as Runstats is performed immediately after a time-consuming Load, Reorg, or Recover Index operation, the two operations together may simply take too long for some users. Furthermore, the two operations together incur excessive processor and input/output resources since each operation separately signs the data, for its own purposes. Thus, in many cases, known techniques for gathering statistics about data structures in a DBMS are not completely adequate.

SUMMARY OF THE INVENTION

Broadly, the present invention concerns the loading, reorganizing, or recovering of a data structure while concurrently collecting various statistics about the data structure. Such data structures, for example, may comprise tables and/or indices.

A first processing unit forms a data structure by assimilating data from one or more data sources into data rows, storing the rows in a buffer, and copying the rows from the buffer to the data structure. The forming of this data structure may involve, for instance, a Load, Reorg, or Recover Index operation. Concurrently with the forming step, the first or a second processing unit retrieves the rows from the buffer and applies a predetermined analysis to the rows to formulate statistics regarding the data structure.

As a specific example, the invention may be implemented to provide a method of generating a data structure while concurrently analyzing the data structure. In addition, the invention may also be implemented to provide an apparatus useful for generating and concurrently analyzing a data structure. In still another embodiment, the invention may be implemented to provide an article of manufacture comprising a data storage device tangibly embodying a program of machine-readable instructions executable by a digital data processing apparatus to perform method steps for concurrently generating and analyzing a data structure.

The invention affords its users with a number of distinct advantages. Normally, when Runstats is performed immediately after a Load, Reorg or Recover Index operation, the combined operations process the entire data structure twice. The data structure is processed once when the data is loaded, reorganized, or the index recovered, and then again when the statistics are gathered. With the present invention, however, statistical analysis of data is performed concurrently with the Load, Reorg, or Recover Index operation. Consequently, only one access to the data structure is needed for the simultaneous operations. Thus, as compared to previously known statistics-gathering operations, the Runstats operation of the invention uses half the number input/output operations.

Furthermore, the method of the invention is especially advantageous since it may use a separate processing unit to perform its statistical analysis. Therefore, the processing unit performing the Load, Reorg, or Recover Index operation is not burdened with the additional task of analyzing the data structure.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 3 is a flowchart illustrating a sequence of method steps simultaneously form and analyze a data structure in a multiprocessing system.

DETAILED DESCRIPTION OF THE PREFERRED EMBODIMENTS

Hardware Components & Interconnections

Figure 1:
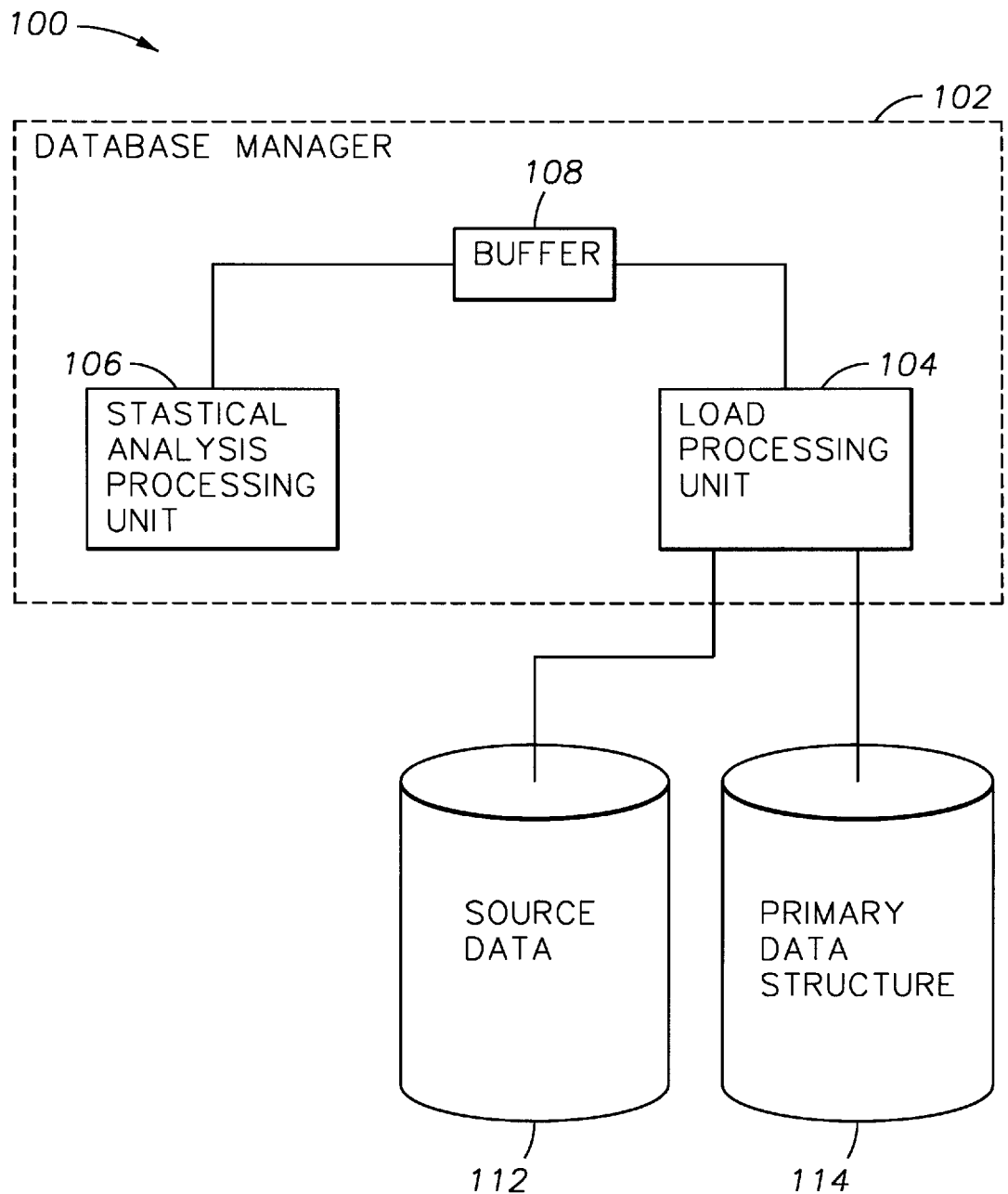
FIG. 1 is a block diagram of a system exemplifying hardware components and interconnections pursuant to the invention.

One aspect of the invention concerns a DBMS 100, which may be embodied by various hardware components and interconnections as described in FIG. 1.

Database Manager

The DBMS 100 includes a database manager 102. Preferably, the DBMS 100 comprises a multiprocessing computer such as an IBM System 390 model 9672 mainframe computer. The database manager 102 may utilize an operating system such as IBM MVS, for example. And, although other database languages may be used, the DBMS 100 preferably uses the DB2 language of International Business Machines Corp.

Data Items

The DBMS 100 also includes a number of different data items. In the illustrated example, these items of data include source data 112 and a data structure 114. It should be apparent to ordinarily skilled artisans (having the benefit of this disclosure) that multiple data items may reside on a single device, or may be dispersed among multiple different devices. For example, the source data 112 may represent data from a multiplicity of different storage devices. The data structure 114 is preferably stored on a single data storage device (as illustrated), although it may be striped or otherwise distributed among multiple devices.

The data storage devices for storing the source data 112 and data structure 114 may comprise, for example, magnetic data storage disk drives, optical disk drives, optical or magnetic tape, random access memory, or any other suitable storage device.

Processing Units

The database manager 102 preferably includes one or more processing units, such as the illustrated load processing unit 104 and statistical analysis processing unit 106. Although not shown, a single multitasking processing unit may be used, where separate operational procedures are performed in a split-cycle fashion, for example. Nonetheless, multiple processing units, as illustrated, are preferred to maximize operation speed. Each processing unit 104/106 may comprise a microprocessor or another suitable digital data processing apparatus. In an embodiment where the DBMS 100 comprises an IBM System 390 computer, for example, each processing unit 104/106 may comprise a central processing unit ("CPU") of the computer.

The load processing unit 104 is coupled to the source data 112 and the data structure 114 for the purpose of obtaining raw data records, assembling the data records, and ultimately storing the data records in the data structure 114. As discussed below, the load processing unit 104 may be used to load source data 112 into the data structure 114, as well as other functions such as performing a Reorg or Recover Index operation upon the data structure 114.

Buffer

The processing units 104/106 are interconnected by a buffer 108. As discussed below, the processing unit 106 employs the buffer 108 to review and analyze data being processed by the load processing unit 104. The buffer 108 preferably comprises a fast access memory such as random access memory ("RAM").

The operation of the foregoing components is discussed in greater detail below.

Operation

In addition to the various hardware embodiments described above, a different aspect of the invention concerns a method for forming a data structure while concurrently collecting various statistics about the data structure. As discussed in greater detail below, the data structure may be formed by many different procedures such as loading a new table or index, reorganizing an existing table or index, or recovering an existing index.

Such a method is preferably implemented by operating the DBMS 100 to execute a sequence of machine-readable instructions.

Data Storage Device

These instructions may reside in various types of data storage media. In this respect, one aspect of the present invention concerns an article of manufacture, comprising a data storage medium tangibly embodying a program of machine-readable instructions executable by a digital data processing unit to perform method steps to perform operations such as loading, copying, and restoration of a data structure.

Figure 2:
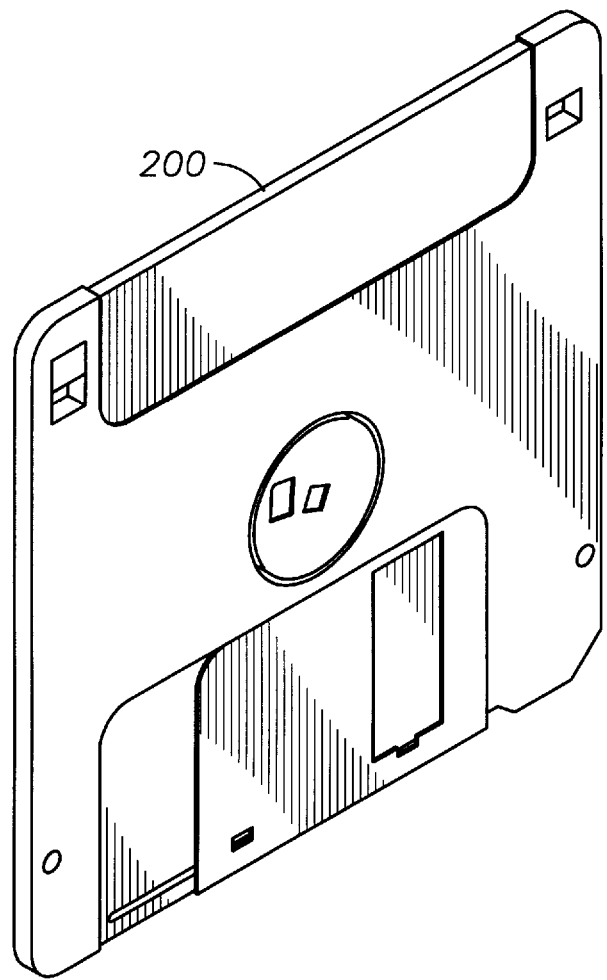
FIG. 2 is a perspective view showing one example of an article of manufacture pursuant to the invention.

This data storage medium may reside, for example, in a RAM program storage buffer (not shown) contained in the database manager 102. Alternatively, the instructions may be contained in another data storage medium, such as a magnetic data storage diskette 200 (FIG. 2). Whether contained in the database manager 102 or elsewhere, the instructions may instead be stored on another type of data storage medium such as hard drive storage (e.g., a conventional magnetic disk or RAID array), magnetic tape, electronic read-only memory (e.g. ROM), an optical storage device (e.g. WORM), paper "punch" cards, or other suitable data storage media. In an illustrative embodiment of the invention, the machine-readable instructions may comprise lines of compiled DB2 language code.

Operational Sequence, Generally

FIG. 3 shows a sequence of method steps 300 to illustrate one exemplary operational sequence typifying the method aspect of the present invention. This operational sequence manages a multiprocessing computer to form a data structure while concurrently collecting various statistics about the data structure. For ease of explanation, but without any limitation intended thereby, the example of FIG. 3 is described in the context of the DBMS 100 shown in FIG. 1. Furthermore, for ease of explanation, the sequence 300 describes the use of a Load operation to form the data structure 114, where the data structure 114 comprises a table.

Opening the Pipe

After the steps 300 are initiated in step 302, the load processing unit 104 in task 304 opens a "pipe" with which to pass data to the statistical analysis processing unit 106. A pipe is a construct which will be known to a skilled practitioner of the art, consisting of a buffer (represented in FIG. 1 by buffer 108) and an associated set of operations that allow data to be passed through the buffer from one processing unit to another processing unit.

Concurrent Table Formation and Statistical Analysis

After step 304, routines 350 and 352 begin concurrently. Generally, in the routine 350 the load processing unit 104 assembles data records obtained from the source data 112 into "rows", collects the rows into larger units ("pages" or "blocks"), places the rows in the pipe buffer 108, and writes the pages to the data structure 114. In the routine 352, the statistical analysis processing unit 106 obtains the rows from the pipe buffer 108 and conducts various statistical analysis upon the rows. The routines 350/352 can be performed simultaneously because the DBMS 100 includes separate processing units 104/106. Although not illustrated, a single processing unit may simultaneously execute the routines 350/352 by split-cycle sharing of processing time or another suitable multitasking technique.

Obtaining Data Records from Source Data

The routine 350 begins in step 316, where the load processing unit 104 obtains data records from the source data 112. As mentioned above, the source data 112 may reside on one or more data storage devices of various makes and models.

After task 316, query 318 asks whether the load processing unit 104 is done forming and storing rows. This may occur, for example, when the load processing 104 has culled the source data 112 completely and formed all resultant rows. If query 318 answers "yes", then data has been obtained from the source data 112, and the load processing unit 104 proceeds to step 320 to form rows from the data records. If query 318 answers "no", then there are no more rows to form, and the load processing unit 104 proceeds to step 328.

Table Formation

In step 320 the load processing unit 104 uses the data records obtained in task 316 to form a row. Each row is a subcomponent of a table, which embodies the data structure 114 in the illustrated example. In the illustrated example, the rows are assembled into "pages" or "blocks" before being written to the data structure 114. Thus, after step 320 query 322 determines if the page currently being assembled contains sufficient room to hold the row just formed in task 320.

If there is not enough room, step 324 writes the page to the data structure 114, formats a new page, and proceeds to step 326. At this point certain non-data pages may also be written to the data structure 114. For instance, "space map" pages indicate a state of space availability within the data structure 114.

If query 322 determines that there is sufficient room to hold the row, step 326 places the row in the page. Step 326 also places the row in the pipe buffer 108, which provides the statistical analysis processing unit 106 with immediate access to the row.

Following step 326, the processing unit 104 proceeds to step 316 to obtain additional data records, and the processing described above repeats unit query 318 indicates that there are no more records available from the source data 112. The processing unit 104 then proceeds to steps 328–332, which write any pages that have been partially filled by rows to the data structure 114 (step 328), signal that the pipe buffer 108 is closed (step 330), and then wait for the statistics processor 106 to complete step 314 (step 332). Following step 332, the routine 350 ends in step 334.

Conducting Statistical Analysis

As mentioned above, the routine 352 operates concurrently with the routine 350. In the routine 350, the load processing unit 104 assembles data records obtained from the source data 112 into "rows", places them in the pipe buffer 108, and collects and writes the rows to the data structure 114. Concurrently with the routine 350, the statistical analysis processing unit 106 in the routine 352 reviews the rows in the pipe buffer 108, conducting various statistical analyses upon the rows.

Retrieving and Analyzing Rows

The routine 352 starts in step 306, where the statistical analysis processing unit 106 attempts to retrieve a completed row from the pipe buffer 108. Then query 308 determines whether or not a row can be obtained from the pipe buffer. If so, the obtained row is analyzed by the statistical analysis processing unit 106 with performance of task 310. All rows placed into the pipe buffer 108 by the load processing unit 104 will be ultimately retrieved by the statistical analysis processing unit 106. After the last row has been retrieved, the next attempt to retrieve a row will receive a signal (issued by the load processing unit 104 in task 330) that the pipe has been closed, and query 308 will determine that no more rows can be obtained.

The statistical analysis of task 310 may involve a number of different features of the data. Certain features concern the characteristics of the data itself. One example is "cardinality", which refers tot he number of rows in the data structure. Another statistical feature is the "column cardinality", which refers to the estimated number of distinct values possible for each column of the table. For example, a column representing a person's state of U.S. residence might have a column cardinality of fifty. This means that, no matter how many rows are in the table, there are only fifty distinct values for that column.

In addition to features concerning the data itself, other statistics concern the way in which the data is stored. One example is the percentage of rows that are in clustering order, called the "cluster ratio". If a table is defined with a clustering key, then rows should optimally be stored in a sequence by the value of that key. The cluster ratio is therefore the percentage of rows that are in the proper order. Another useful statistics is the percentage of space in the data structure occupied by data, i.e. "percent active" space. Of the total space allocated to a database on a storage device, the amount used by the database table is the "percent active", the rest is free space.

When the query 308 determines that the statistical analysis processing unit 106 has processed all rows of the data structure 114, task 312 stores the results of the statistical analysis in a "data dictionary" or other suitable index or catalog. As an example, the statistical analysis processing unit 106 may store the data dictionary in storage (not shown) of the database manager 102. As an alternative, the statistical analysis processing unit 106 may instead forward the data to the load processing unit 104 for storage elsewhere, such as with the data structure 114. Following task 312, the routine 352 ends in task 314.

Other Embodiments

While there have been shown what are presently considered to be preferred embodiments of the invention, it will be apparent to those skilled in the art that various changes and modifications can be made herein without departing from the scope of the invention as defined by the appended claims.

For instance, ordinarily skilled artisans will appreciate that, in addition to loading tables, the operational sequence 300 is similarly applicable to indices, as well as other operations such as the reorganization of existing data structures, or recovery of tables or indices.

What is claimed is:

1. A method for operating a multiprocessing system to generate a data structure while concurrently analyzing the data structure, comprising:

forming a data structure by assembling data from one or more data sources into data rows, storing the rows in a buffer, and copying the rows from the buffer to the data structure; and substantially concurrently with the forming of the data structure, retrieving the rows from the buffer and applying a predetermined analysis to the rows to formulate statistics regarding the data structure.

2. The method of claim 1, wherein the data structure is formed by a first processing unit and the predetermined analysis is applied by a second processing unit.

3. The method of claim 1, the forming of the data structure, retrieving of the rows, and applying of the predetermined analysis being performed substantially concurrently by a single processing unit.

4. The method of claim 1, the data structure comprising a table.

5. The method of claim 1, the data structure comprising an index.

6. The method of claim 1, the data structure including a plurality of sub-parts, the applying of a predetermined analysis comprising examining each sub-part of the data structure to determine at least one predetermined characteristic of the entire data structure.

7. The method of claim 1, the one or more data sources including a previous version of the data structure, the forming of the data structure forming the data structure by reorganizing the previous version of the data structure.

8. The method of claim 1, the one or more data sources comprising a backup copy of the data structure, the forming of the data structure forming the data structure by recovering the data structure from the backup copy.

9. The method of claim 1, the forming of the data structure updating a previously existing data structure by adding new data rows, thereto.

10. An article of manufacture comprising a data storage medium tangibly embodying a program of machine-readable instructions executable by a digital processing apparatus to perform a method for generating a data structure while concurrently analyzing the data structure, said method comprising:

forming a data structure by assembling data from one or more data sources into data rows, storing the rows in a buffer, and copying the rows from the buffer to the data structure; and substantially concurrently with the forming of the data structure, retrieving the rows from the buffer and applying a predetermined analysis to the rows to formulate statistics regarding the data structure.

11. The article of manufacture of claim 10, where in the data structure is formed by a first processing unit and the predetermined analysis is applied by a second processing unit.

12. The article of manufacture of claim 10, the forming of the data structure, retrieving of the rows, and applying of the predetermined analysis being performed substantially concurrently by a single processing unit.

13. The article of manufacture of claim 10, the data structure comprising a table.

14. The article of manufacture of claim 10, the data structure comprising an index.

15. The article of manufacture of claim 10, the data structure including a plurality of sub-parts, the applying of a predetermined analysis comprising examining each sub-part of the data structure to determine at least one predetermined characteristic of the entire data structure.

16. The article of manufacture of claim 10, the one or more data sources including a previous version of the data structure, the forming of the data structure forming the data structure by reorganizing the previous version of the data structure.

17. The article of manufacture of claim 10, the one or more data sources comprising a backup copy of the data structure, the forming of the data structure forming the data structure by recovering the data structure from the backup copy.

18. The article of manufacture of claim 10, the forming of the data structure updating a previously existing data structure by adding new data rows, thereto.

19. A multiprocessing system, comprising:

a data storage unit comprising at least one data storage device;

a buffer; and a multiprocessing system including first and second processing units, the first and second processing units coupled to the buffer, the first processing unit additionally coupled to the storage unit, the multiprocessing system being programmed to perform method steps comprising:

the first processing unit forming a data structure by assembling data from one or more data sources into data rows, storing the rows in the buffer, and copying the rows from the buffer to the data structure in the data storage unit; and concurrently with the forming step, the second processing unit retrieving the rows from the buffer and applying a predetermined analysis to the rows to formulate statistics regarding the data structure.

20. The multiprocessing system of claim 19, the data structure comprising a table.

21. The multiprocessing system of claim 19, the data structure comprising an index.

22. The multiprocessing system of claim 19, the data structure including a plurality of sub-parts, the applying of a predetermined analysis comprising examining each sub-part to determine at least one predetermined characteristic of the entire data structure.

23. The multiprocessing system of claim 19, the one or more data sources including a previous version of the data structure, the forming of the data structure forming the data structure by reorganizing the previous version of the data structure.

24. The multiprocessing system of claim 19, the one or more data sources comprising a backup copy of the data structure, the forming of the data structure forming the data structure by recovering the data structure from the backup copy.

25. The multiprocessing system of claim 19, the forming of the data structure updating a previously existing data structure by adding new data rows, thereto.

26. A multiprocessing system, comprising:

a data storage unit comprising at least one data storage device;

a buffer; and a processing unit coupled to the buffer and the storage unit, the processing unit being programmed to perform a method comprising:

the processing unit forming a data structure by assembling data from one or more data sources into data rows, storing the rows in the buffer, and copying the rows from the buffer to the data structure in the data storage unit; and concurrently with the forming of the data structure, the processing unit retrieving the rows from the buffer and applying a predetermined analysis to the rows to formulate statistics regarding the data structure.

27. The multiprocessing system of claim 26, the data structure comprising a table.

28. The multiprocessing system of claim 26, the data structure comprising an index.

29. The multiprocessing system of claim 26, the data structure including a plurality of sub-parts, the applying of a predetermined analysis comprising examining each sub-part of the data structure to determine at least one predetermined characteristic of the entire data structure.

30. The multiprocessing system of claim 26, the one or more data sources including a previous version of the data structure, the forming of the data structure forming the data structure by reorganizing the previous version of the data structure.

31. The multiprocessing system of claim 26, the one or more data sources comprising a backup copy of the data structure, the forming of the data structure forming the data structure by recovering the data structure from the backup copy.

32. The multiprocessing system of claim 27, the forming of the data structure updating a previously existing data structure by adding new data rows, thereto.

* * * * *